Patented Oct. 7, 1952

2,613,193

UNITED STATES PATENT OFFICE 2,613,193

SPRAYABLE POLYTETRAFLUOROETHYLENE AQUEOUS SUSPENSOIDS CONTAINING AN ORGANIC LIQUID

Le Verne Kenneth Osdal, Upper Darby, Pa., assignor to E. I. du Pont de Nemours and Company, Wilmington, Del., a corporation of Delaware No Drawing. Application January 10, 1950, Serial No. 137,890

21 Claims. (Cl. 260—29.6)

1

This invention relates to improvements in aqueous colloidal suspensoids of polytetrafluoroethylene and, more particularly, to such suspensoids having improved spray application characteristics.

United States Patent 2,230,654 describes a method of preparing polytetrafluoroethylene. Copending applications Serial No. 713,385, filed November 30, 1946, now U. S. Patent No. 2,534,058, by Malcolm M. Renfrew, and Serial No. 23,400, filed April 26, 1948, now abandoned, and Serial No. 107,137, filed July 27, 1949, now abandoned, by Kenneth L. Berry, disclose methods of preparing aqueous suspensoids of polytetrafluoroethylene. United States Patent 2,478,299, issued to Kenneth L. Berry, and copending application Serial No. 783,389, filed October 31, 1947, now abandoned, by Carl K. Ikeda, disclose methods of concentrating relatively dilute aqueous suspensoids of polytetrafluoroethylene.

Aqueous suspensoids of polytetrafluoroethylene are useful, among other things, in forming coatings on various substrates by baking or fusing the polymeric particles of such a suspensoid on the substrate at or above the fusion temperature of the polymer (621° F.). However, these aqueous colloidal suspensoids do not behave like ordinary paints, enamels, or lacquers, and, in particular, it has always been difficult to obtain smooth uniform films therefrom by spraying. In spraying such suspensoids, a normal spray pattern of air and dispersed droplets occurs during the first few minutes of the operation, but the suspensoid quickly coagulates in the narrow fluid passages of the spray gun and successively results in partial plugging of the orifices with an accompanying spray of irregular blobs of agglomerated polymer particles and, finally, in a complete plugging of the passages with a resultant cessation of the operation. This is believed to be directly traceable to the fact that when aqueous suspensoids of polytetrafluoroethylene are agitated strongly, or are otherwise subjected to rapid motion, such as occurs in spraying, the minute discrete polymer particles tend to agglomerate or coagulate into a plastic mass which separates from the aqueous suspending medium. Besides the inconvenience of the cessation of the operation, further trouble is encountered in unplugging the gun, because polytetrafluoroethylene is not soluble in the usual solvents.

2

It is known that adding finely divided pigment to polytetrafluoroethylene aqueous suspensoids makes them more easily sprayable. However, still further improvement in their sprayability is desirable, particularly where pigments are objectionable.

The principal object of this invention, therefore, is the production of an aqueous suspensoid of polytetrafluoroethylene which can be sprayed readily in an ordinary paint spray gun for prolonged periods without plugging the fluid passages in the gun.

A further object of this invention is the preparation of an aqueous suspensoid of polytetrafluoroethylene which has the spraying characteristics of ordinary paint, varnish, and lacquer.

These objects are accomplished by emulsifying a premade aqueous suspensoid of substantially completely polymerized tetrafluoroethylene with an organic liquid emulsifiable therewith.

In a preferred embodiment of this invention, a premade aqueous suspensoid comprising substantially completely polymerized tetrafluoroethylene, wetting agent, and water is agitated with additional wetting or emulsifying agent and toluene, the principal ingredients being present in the final composition in the ratio of 45 parts of polytetrafluoroethylene to 48.7 parts of water and 6.3 parts of toluene. This produces a creamy emulsion which is easily and continuously sprayable in a conventional paint spray gun.

The following examples, in which the parts are by weight, illustrate the methods and products of this invention:

EXAMPLE 1

A concentrated polytetrafluoroethylene aqueous suspensoid produced by the polymerization of tetrafluoroethylene in water as described in the copending applications of Kenneth L. Berry, Serial No. 23,400, filed April 26, 1948, or Serial No. 107,137, filed July 27, 1949, and modified by the addition of "Duponol" ME, had the following composition:

| | Parts |
|---|---|
| Finely divided polytetrafluoroethylene | 59.0 |
| "Duponol" ME | 0.6 |
| Water | 40.4 |
| | 100.0 |

"Duponol" ME is the sodium salt of the sulphuric acid ester of a mixture of long chain alcohols, predominantly lauryl alcohol.

This aqueous suspensoid was emulsified as follows:

| | Parts |
|---|---|
| Aqueous suspensoid of polytetrafluoroethylene | 3920 |
| Distilled water | 908 |
| "Duponol" ME | 36 |
| Toluene | 320 |
| "Triton" N-100 | 77 |
| | 5261 |

"Triton" N-100 is a long chain alkyl aryl polyether alcohol.

The polytetrafluoroethylene suspensoid was placed in a glass beaker and stirred moderately with a mechanical agitator so that the liquid was moving freely without cavitation or splashing, which tend to cause coagulation. The remaining ingredients were added slowly in the order shown with continued moderate agitation. Stirring was continued for 2 or 3 minutes and then stopped when it was apparent that the ingredients were uniformly mixed.

A smooth emulsion resulted which was stable and did not break on standing in a closed glass bottle. It had the following composition:

| | Per cent |
|---|---|
| Finely divided polytetrafluoroethylene | 44.0 |
| Water | 47.4 |
| "Duponol" ME | 1.1 |
| Toluene | 6.0 |
| "Triton" N-100 | 1.5 |
| | 100.0 |

This emulsion was sprayed onto a test panel using a conventional paint spray gun (De Vilbiss MBC suction type using an FF tip with a No. 30 cap). The emulsion sprayed easily, produced a smooth, uniform wet coat on the test panel, and did not plug the gun. When all of the suspensoid had been sprayed, the fluid passages of the gun were easily cleaned by rinsing with water.

Other emulsions of the polytetrafluoroethylene aqueous suspensoids were prepared, as in Example 1, and had the compositions shown in the following table:

*Table*

| Ex. | Aqueous Suspensoid | | | Additional Water | Emulsifying Agent | Organic Liquid |
|---|---|---|---|---|---|---|
| | Polytetrafluoroethylene | "Duponol" ME | Water | | | |
| 2 | 14.07 | 0.15 | 9.6 | 19.5 | 2.90 (a) | 48.9 Toluene (b). 7.3 Acetone. |
| 3 | 36.2 | 0.36 | 16.3 | 21.1 | 1.30 (a) | 26.4 Toluene (b). |
| 4 | 40.4 | 0.40 | 18.3 | 17.7 | 1.50 (a) | 23.6 Toluene (b). |
| 5 | 40.4 | 0.40 | 18.3 | 23.6 | 1.50 (a) | 17.7 Toluene (b). |
| 6 | 40.4 | 0.40 | 18.3 | 29.5 | 1.50 (a) | 11.8 Toluene (b). |
| 7 | 40.4 | 0.40 | 18.3 | 35.4 | 1.50 (a) | 5.9 Toluene (b). |
| 8 | 40.4 | 0.40 | 18.3 | 38.4 | 1.50 (a) | 2.9 Toluene (b). |
| 9 | 42.4 | 0.42 | 21.5 | 27.6 | 2.10 (a) | 8.5 Polydimethylsiloxane (c). |
| 10 | 42.6 | 0.43 | 17.8 | 19.5 | 2.00 (a) | 20.1 Hydrocarbon (d). |
| 11 | 42.6 | 0.43 | 17.8 | 19.5 | 2.00 (a) | 20.1 Benzene (b). |
| 12 | 44.5 | 0.45 | 18.6 | 24.2 | 1.30 (a) | 6.35 "Freon" 113. 6.35 Perfluorocarbon Lube Oil (e). |
| 13 | 45.7 | 0.46 | 28.7 | 19.5 | 0.75 (f) 1.50 (a) | 6.1 Mineral Oil (g). |
| 14 | 45.7 | 0.46 | 28.7 | 19.5 | 0.75 (f) 1.50 (a) | 6.1 Hydrocarbon (h). |
| 15 | 45.8 | 0.46 | 20.7 | 27.4 | 1.30 (a) | 6.1 Toluene (b). |
| 16 | 47.1 | 0.47 | 30.9 | 14.1 | 1.50 (a) | 7.9 V.M. & P. Naphtha (j). |
| 17 | 47.2 | 0.47 | 31.0 | 15.9 | | 5.9 Toluene (b). |
| 18 | 47.6 | 0.47 | 31.3 | 15.1 | 1.00 (k) | 6.0 Toluene (b). |
| 19 | 49.4 | 0.50 | 33.8 | | 3.40 (a) | 16.8 Hydrocarbon (m). |
| 20 | 50.6 | 0.51 | 22.8 | 19.2 | 1.50 (a) | 7.4 Toluene (b). |
| 21 | 50.6 | 0.51 | 22.8 | 22.9 | 1.50 (a) | 3.7 Toluene (b). |
| 22 | 55.9 | 0.56 | 25.3 | 10.6 | 1.60 (a) | 8.2 Toluene (b). |
| 23 | 60.0 | 0.60 | 39.4 | | | 0.6 Toluene (b). |

(a) = "Triton" N-100.
(b) = 100% aromatic.
(c) = (Viscosity 1000 centistokes).
(d) = 35% paraffins-20% naphthenes-45% aromatics.
(e) = 100% halogenated hydrocarbons (B. P. 150°-170°-C/10 mm. Hg).
(f) = "Duponol" ME.
(g) = Cosmetic grade clear mineral oil.
(h) = 75% paraffins-25% naphthenes.
(j) = 59% paraffins-33% naphthenes-8% aromatics.
(k) = Ammonium oleate.
(m) = 11% paraffins-17% naphthenes-72% aromatics.

All of the compositions in the above table, when sprayed on test panels, sprayed more easily than the unemulsified suspensoid, gave uniform films, and did not plug the spray gun.

EXAMPLE 24

| | Parts |
|---|---|
| China clay | 804 |
| Distilled water | 1292 |
| "Duponol" ME | 8 |
| | 2104 |

The above ingredients were ground in a pebble mill to produce a slurry of finely divided pigment in water.

| | Parts |
|---|---|
| Pigment slurry above | 1117 |
| Emulsified suspensoid of Example 1 | 4135 |
| | 5252 |

These ingredients were blended slowly with moderate agitation in a stainless steel vessel. The resulting product was a smooth emulsified pigmented polytetrafluoroethylene suspensoid having the following composition:

| | Per cent |
|---|---|
| Finely divided polytetrafluoroethylene | 34.6 |
| China clay | 8.1 |
| Water | 50.4 |
| "Duponol" ME | 1.0 |
| Toluene | 4.8 |
| "Triton" N-100 | 1.1 |
| | 100.0 |

This product was easily sprayable in an ordinary paint spray gun and produced a smooth uniform relatively thick film on a test panel. Prolonged spraying did not plug the gun.

An aqueous suspensoid of polytetrafluoroethylene pigmented with china clay in the same ratio as in this example but not emulsified with toluene sprayed more easily than the corresponding unpigmented product, but was difficult to apply smoothly, and uniform relatively thick films could not be obtained.

EXAMPLE 25

Pigment slurry

| | Parts |
|---|---|
| Titanium dioxide white pigment | 610 |
| Distilled water | 1292 |
| "Duponol" ME | 8 |
| | 1910 |

Emulsion

| | Parts |
|---|---|
| Pigment slurry above | 1117 |
| Emulsified suspensoid of Example 1 | 4135 |
| | 5252 |

Final composition

| | Per cent |
|---|---|
| Finely divided polytetrafluoroethylene | 34.6 |
| Titanium dioxide white pigment | 6.8 |
| Water | 51.8 |
| "Duponol" ME | 0.9 |
| Toluene | 4.8 |
| "Triton" N-100 | 1.1 |
| | 100.0 |

EXAMPLE 26

Pigment slurry

| | Parts |
|---|---|
| Chromium tetrahydrate green pigment | 950 |
| Distilled water | 1292 |
| "Duponol" ME | 8 |
| | 2250 |

Emulsion

| | Parts |
|---|---|
| Pigment slurry above | 1117 |
| Emulsified suspensoid of Example 1 | 4135 |
| | 5252 |

Final composition

| | Per cent |
|---|---|
| Finely divided polytetrafluoroethylene | 34.6 |
| Chromium tetrahydrate green pigment | 9.0 |
| Water | 49.5 |
| "Duponol" ME | 1.0 |
| Toluene | 4.8 |
| "Triton" N-100 | 1.1 |
| | 100.0 |

EXAMPLE 27

Pigment slurry

| | Parts |
|---|---|
| Iron oxide red pigment | 550 |
| Distilled water | 1292 |
| "Duponol" ME | 8 |
| | 1850 |

Emulsion

| | Parts |
|---|---|
| Pigment slurry above | 1117 |
| Emulsified suspensoid of Example 1 | 4135 |
| | 5252 |

Final composition

| | Per cent |
|---|---|
| Finely divided polytetrafluoroethylene | 34.6 |
| Iron oxide red pigment | 6.4 |
| Water | 52.1 |
| "Duponol" ME | 1.0 |
| Toluene | 4.8 |
| "Triton" N-100 | 1.1 |
| | 100.0 |

The products of the above three examples were prepared as in Example 24 and were comparable thereto in spraying characteristics.

Organic liquids other than those shown in the examples are operable in this invention. In general, any volatile organic solvent material of the type generally used in the paint industry can be emulsified with polytetrafluoroethylene aqueous suspensoid to produce a sprayable product within the scope of this invention. Ordinarily, such solvents have boiling points above room temperature and below about 250° C., although the boiling point is not critical and may be at any point consistent with the other desirable properties of the product. Other substances with which the polytetrafluoroethylene suspensoids may be emulsified include the normally liquid paraffin hydrocarbons (e. g., pentane, hexane, heptane, or octane), aromatic hydrocarbons (e. g., benzene or xylene), cyclo-aliphatic hydrocarbons (e. g., cyclohexane), low, medium, and high boiling mineral spirits, light mineral oils, halogenated hydrocarbons (e. g., carbon tetrachloride or trichloroethylene), and homogeneous mixtures of these. Water miscible, or partially miscible, organic liquid materials (e. g., ethers, alcohols or ketones) may also be added to the polytetrafluoroethylene suspensoids.

Water soluble salts, acids, and bases may be incorporated in the emulsion where they impart desirable properties to the product.

Any aqueous suspensoid of substantially completely polymerized tetrafluoroethylene may be used in the practice of this invention, but the concentrated suspensoids are preferred.

Where pigmented compositions are desired, the ratios can be varied between 1 and 300 parts of pigment to each 100 parts of polytetrafluoroethylene. Any pigment which is substantially insoluble in water and otherwise harmless to the product, and which can be dispersed in a finely divided form in the aqueous suspensoid, may be substituted for the pigments shown in the examples.

As shown in Examples 17 and 23, it is not always necessary to add an emulsifying agent. Furthermore, the particular wetting or emulsifying agents shown in the other examples can be replaced by the same or different amounts of other conventional surface active materials designed for water/organic systems. Such other wetting or emulsifying agents include soaps of the higher fatty acids, alkyl aryl sodium sulfonates, sorbitan salts of the higher acids and their polyoxyethylene derivatives, salts of the sulfates of long chain alcohols, and others conveniently listed in "Synthetic detergents—up to date," John W. McCutcheon, published in Soap and Sanitary Chemicals, August, September and October, 1949. The amount of such agents which it is desired to use in these compositions will vary with the activity of the agent and the concentration of the agent in its commercially available form. The amount is critical for each agent only to the extent that it produces the desired emulsifying action and does not adversely affect the other properties of the product.

While wide variations in the amounts of the principal ingredients are permissible, it is preferred that the organic liquid be present in an amount within the range of 0.5–57%, the polytetrafluoroethylene within the range of 5–74%, and the water within the range of 16–94%; all based on the total amount of these three ingredients. Compositions containing 0.5–57% of organic liquid, 10–70% of polytetrafluoroethylene, and 25–60% of water have been shown in the examples.

Any conventional paint spray gun is suitable for applying the compositions of this invention, such as the suction type spray gun described in Example 1, or the pressure type using an FF tip with a No. 704 cap.

The polytetrafluoroethylene aqueous suspensoids of this invention have been found highly useful for spray coating purposes, and the processes of this invention are useful in applying such suspensoids to various articles where spray application is necessary or desirable.

As many widely different embodiments of this invention may be made without departing from the spirit and scope thereof, it is understood that the invention is not limited to the specific embodiments except as defined in the appended claims.

I claim:

1. A sprayable emulsion comprising a premade aqueous suspensoid of colloidal substantially completely polymerized tetrafluoroethylene and an organic liquid emulsified therewith.

2. The emulsion of claim 1 in which the organic liquid is between about 0.5% and 57% of the total water, polytetrafluoroethylene, and organic liquid.

3. The emulsion of claim 1 in which the polytetrafluoroethylene is between about 5% and 74% of the total water, polytetrafluoroethylene, and organic liquid.

4. The emulsion of claim 1 in which the water is between about 16% and 94% of the total water, polytetrafluoroethylene, and organic liquid.

5. The emulsion of claim 1 in which the organic liquid is an aliphatic hydrocarbon.

6. The emulsion of claim 1 in which the organic liquid is an aromatic hydrocarbon.

7. The emulsion of claim 6 in which the aromatic hydrocarbon is toluene.

8. The emulsion of claim 1 in which the organic liquid is a polysiloxane.

9. A sprayable emulsion comprising a premade aqueous suspensoid of colloidal substantially completely polymerized tetrafluoroethylene, an emulsifying agent, and an organic liquid emulsified therewith.

10. A sprayable emulsion comprising a premade aqueous suspensoid of colloidal substantially completely polymerized tetrafluoroethylene, an emulsifying agent, an organic liquid emulsified therewith, and a pigment.

11. The emulsion of claim 10 in which the pigment is present in a ratio of between about 1 and 300 parts to 100 parts of polytetrafluoroethylene.

12. The emulsion of claim 10 in which the pigment is water insoluble.

13. A sprayable emulsion comprising a premade aqueous suspensoid of colloidal substantially completely polymerized tetrafluoroethylene and an organic liquid emulsified therewith, the organic liquid being between about 0.5% and 57%, the polytetrafluoroethylene being between about 10% and 70%, and the water being between about 25% and 60%, based on the total of these ingredients.

14. The process of producing a sprayable emulsion of a premade aqueous suspensoid of colloidal substantially completely polymerized tetrafluoroethylene which comprises adding to such a suspensoid an organic liquid emulsifiable with said suspensoid and moderately agitating the mixture to emulsify it.

15. The process of claim 14 in which the organic liquid is between about 0.5% and 57% of the total water, polytetrafluoroethylene, and organic liquid.

16. The process of claim 14 in which the organic liquid is an aliphatic hydrocarbon.

17. The process of claim 14 in which the organic liquid is an aromatic hydrocarbon.

18. The process of claim 17 in which the aromatic hydrocarbon is toluene.

19. The process of claim 14 in which the organic liquid is a polysiloxane.

20. The process of producing a sprayable emulsion of a premade aqueous suspensoid of colloidal substantially completely polymerized tetrafluoroethylene which comprises adding to such a suspensoid an emulsifying agent, an organic liquid emulsifiable with said suspensoid, and moderately agitating the mixture to emulsify it.

21. The process of producing a sprayable emulsion of a premade aqueous suspensoid of colloidal substantially completely polymerized tetrafluoroethylene which comprises adding to such a suspensoid an emulsifying agent, an organic liquid emulsifiable with said suspensoid, and a pigment and moderately agitating the mixture to emulsify it.

LE VERNE KENNETH OSDAL.

REFERENCES CITED

The following references are of record in the file of this patent:

UNITED STATES PATENTS

| Number | Name | Date |
|---|---|---|
| 2,393,967 | Brubaker | Feb. 5, 1946 |